Dec. 24, 1929.  A. W. AGLER  1,740,492
JOINT CONSTRUCTION FOR METAL PLATING OF AIRSHIPS
Filed March 9, 1929
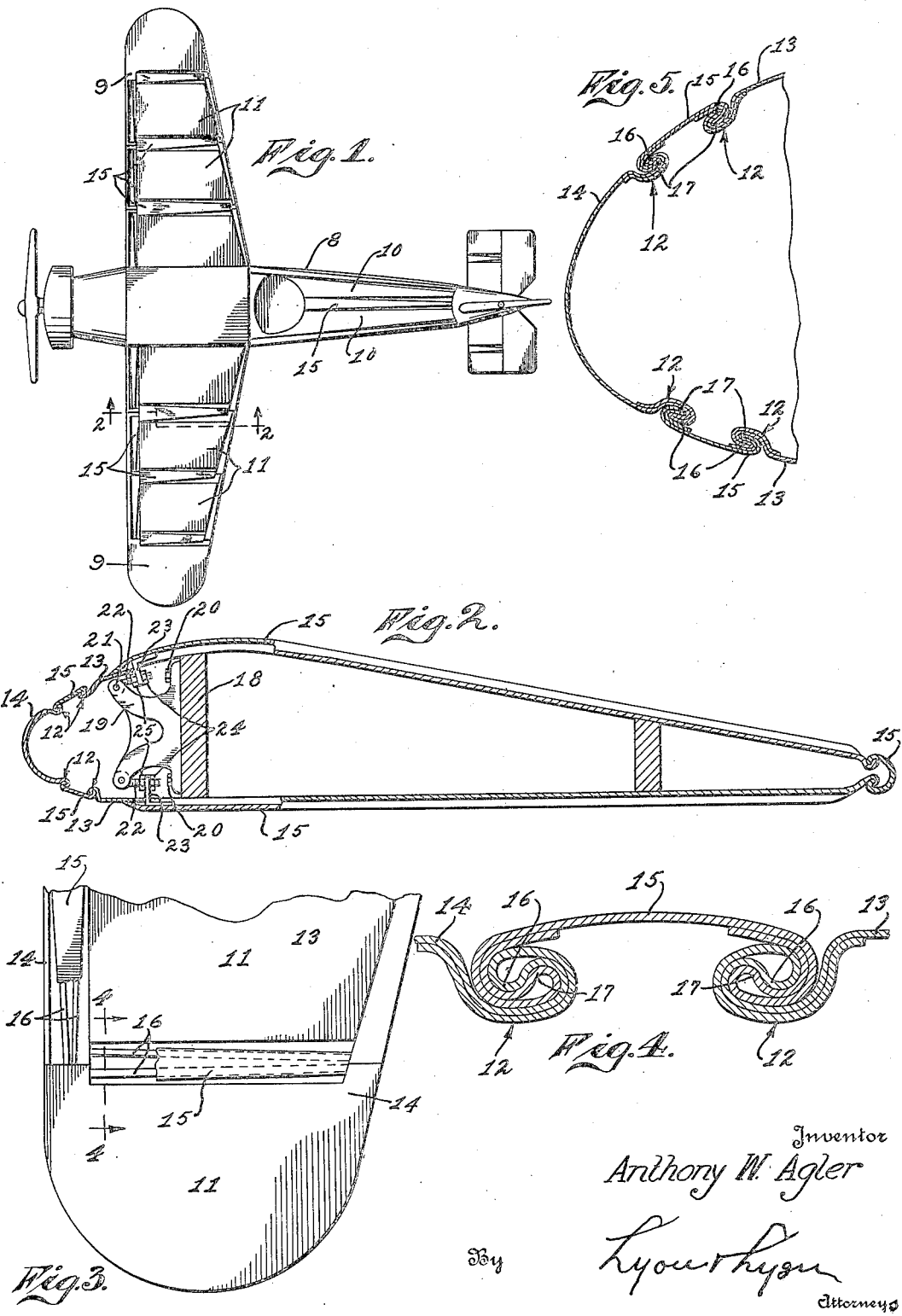
Inventor
Anthony W. Agler
By
Attorneys Patented Dec. 24, 1929

1,740,492

UNITED STATES PATENT OFFICE

ANTHONY W. AGLER, OF LOS ANGELES, CALIFORNIA

JOINT CONSTRUCTION FOR METAL PLATING OF AIRSHIPS

Application filed March 9, 1929. Serial No. 345,630.

This invention relates to joint construction for metal plating of airships, and an object of the invention is to provide a superior means for securing the metal plates together.

The use of relatively thin plates of duralumin or other metal alloy has many advantages and, if the plates could be securely fastened to one another without the employment of rivets, the metal plate covering would probably become universal. The difficulty encountered with the use of the metal plate covering, when rivets are used for connecting the plates, is that the rivet heads pull through the metal. This is due to the fact that the plates are exceedingly thin and the metal much less strong than steel. The wings, especially of an airplane, are subjected to a high degree of vibration, when the airplane is flying, and the vibration has the effect of enlarging the rivet holes so that looseness, at least, of the plates results and, very often, pulling of the rivet heads through the metal, thus permitting the plates to become entirely disconnected.

A further object of the present invention is to make provision for tightening the plates when they are enlarged by expansion.

Another object is to make provision for compensating for both contraction and expansion of the metal plates.

Other objects and advantages will appear in the subjoined detailed description.

The accompanying drawings illustrate the invention.

Figure 1 is a plan view of an airship provided with a metal plate covering constructed in accordance with the provisions of this invention.

Figure 2 is an enlarged vertical section of one of the wings on the irregular line indicated by 2—2, Figure 1.

Figure 3 is an enlarged plan view of one of the wing tips, a portion of one of the plates being broken away.

Figure 4 is an enlarged fragmental vertical section on the line indicated by 4—4, Figure 3.

Figure 5 is an enlarged fragmental sectional view of the leading edge of one of the wings of slightly different construction, the plane of section being the same as that indicated by the line 2—2, Figure 1.

Referring to the drawings, the airship illustrated is of the type known as airplane, but it is to be understood that the invention is applicable to the covering of any type of airship. However, the invention is particularly useful in connection with airplanes because of the vibration to which such type of ship is subjected while in flight.

The body of the airship is indicated at 8 and the wing or wings at 9. The body 8 has a covering 10 and the wings 9 have coverings 11. The coverings 10, 11 are constructed of metal plates made of any suitable alloy as, for example, duralumin or the like.

Various sizes of metal plates for the body and wings are utilized in order to obtain the desired contour of said body and wings. The joints between adjacent plates are indicated at 12. A pair of joints 12 connects a pair of spaced plates with a tension plate. Typical examples of the jointed plates are illustrated in detail in Figures 4 and 5, the spaced plates being indicated at 13, 14 and the tension plate at 15. The adjacent edges of the pair of plates 13, 14 are provided with inturned flanges 16 which extend relatively aslant. In this particular instance, the flanges 16 both extend aslant relative to the longitudinal axes of the plates 13, 14. The tension plate 15 is also provided with inturned flanges 17 which are slidably engaged with the flanges 16, being interlocked therewith. The flanges 17 also extend relatively aslant to correspond with the slant of the flanges 16 so that the pair of plates 13, 14 may be tensioned by relatively sliding the pair of plates and the tensioning plate.

Although it is unnecessary, in order to secure some of the advantages, to do so, it is preferable in order to secure other advantages that the tension plate be normally bent out of a plane between its flanges so as to compensate for contraction of either or both of the plates 13, 14 and to also compensate for contraction of the tension plate.

While in some instances it may not be necessary or advisable that the outer faces of the plates 13, 14, 15 be substantially flush with one another, it is preferable, especially where the joints occur lengthwise of the wing of the airplane, that the flanges of the plates 13, 14 be depressed, as illustrated, to a sufficient extent to cause the outer face of the tension plate to lie substantially flush with the outer faces of the pair of plates 13, 14.

It is to be understood that the plates 13, 14 may be secured to the frame work of the airship by any of the means usually employed for that purpose, such means not being illustrated and described herein for the reason that they are well understood in this art.

Preferably there is provided a means to adjustably hold each pair of spaced plates and the tension plate against relative endwise shifting and such means is, preferably, of a construction that will effect the endwise shifting, when it is desired to either tension or slacken the plates. Each of these means, in this instance, is constructed as follows:

Referring, more particularly, to Figure 2, there is mounted on one of the frame members 18 of the airship a bracket 19 which may be secured to said frame member by bolts 20 or their equivalents. Pivoted at 21 to the bracket 19 are threaded studs 22 which pass through angle brackets 23, each secured to the inner face of one of the tension plates. Each stud 22 is provided with nuts 24, 25 on opposite sides of the bracket 23 with which said stud is associated so that by turning said nuts in one direction the tension plate will be forced rearwardly toward the trailing edge of the wing and by turning said nuts in the opposite direction said tension plate will be drawn forwardly toward the leading edge of the wing. The pivots 21 permit of the studs 22 assuming various angular positions with reference to the bracket 19 when endwise adjustments of the tension plate are made.

The invention operates as follows: The plates having been assembled, in the manner illustrated in the drawings, so as to form the covering for the body and wings of the airplane, and assuming that the plates require tensioning because, for example, of the airplane having been in use for a considerable length of time or of the fact that the airplane has been taken to a locality in which higher temperatures prevail, the plates will be tensioned by turning the nuts 24, 25 in the appropriate direction. For example, in Figure 2 the nuts will be turned in a direction to move them toward the pivot 21, thereby drawing the tension plate 15 forwardly toward the leading edge of the wing. Since the flanges 16 of the plates extend aslant so that they are spaced farther apart at the forward ends of the plates 13, 14 than they are at the rear ends of said plates, and since the flanges 17 are likewise spaced farther apart at the forward end of the tensioning plate than at the rear end thereof, the forward sliding of the tensioning plate 15 entails pulling the plates 13, 14 toward the plate 15 or, at least, pulling the marginal portions of said plates 13, 14 toward the plate 15, thereby tensioning said plates 13, 14. The material of the tensioning plates 15 has a sufficiently springy character to it to normally cause it to bow, thereby yieldingly holding the plates 13, 14 toward one another. Thus when the airplane ascends into a region of lower temperature, causing contraction of the plates, the tensioning plates 15 will yield, thus to compensate for said contraction.

It is to be noted that the tensioning plates close the spaces between the plates 13, 14 so that said tensioning plates function, also, as effective portions of the covering of the airship. In the drawings the tensioning plates 15 are illustrated as being materially narrower than the plates 13, 14, but it is to be understood that the relative widths of the plates may be changed within the scope of this invention, as defined in the appended claims.

I claim:

1. A joint construction for metal plating for airships comprising a pair of spaced plates, the adjacent edges of said plates provided with inturned flanges extending relatively aslant, and a tensioning plate provided with inturned flanges slidably engaged with the first mentioned flanges, the flanges of the tensioning plate extending relatively aslant to correspond with the slant of the first mentioned flanges so that said pair of plates may be tensioned by relatively sliding the pair of plates and the tensioning plate.

2. A joint construction for metal plating for airships comprising a pair of spaced plates, the adjacent edges of said plates provided with inturned flanges extending aslant relative to the longitudinal axes of said plates, and a tensioning plate provided with inturned flanges slidably engaged with the first mentioned flanges, the flanges of the tensioning plate extending aslant relative to the axis thereof to correspond with the slant of the first mentioned flanges so that said pair of plates may be tensioned by relatively sliding the pair of plates and the tensioning plate.

3. A joint construction for metal plating for airships comprising a pair of spaced plates, the adjacent edges of said plates provided with inturned flanges extending relatively aslant, and a tensioning plate provided with inturned flanges slidably engaged with the first mentioned flanges, the flanges of the tensioning plate extending relatively aslant to correspond with the slant of the first mentioned flanges, the tensioning plate being normally bent out of a plane between its flanges so as to compensate for contraction of any one of the plates.

4. A joint construction for metal plating for airships comprising a pair of spaced plates, the adjacent edges of said plates provided with inturned flanges extending relatively aslant, and a tensioning plate provided with inturned flanges slidably engaged with the first mentioned flanges, the flanges of said tensioning plate extending relatively aslant to correspond with the slant of the first mentioned flanges, and the flanges of the pair of plates being depressed sufficiently to cause the outer face of the tensioning plate to lie substantially flush with the outer faces of the pair of plates.

5. A joint construction for metal plating for airships comprising a pair of spaced plates, the adjacent edges of said plates provided with inturned flanges extending relatively aslant, a tensioning plate provided with inturned flanges slidably engaged with the first mentioned flanges, the flanges of the tensioning plate extending relatively aslant to correspond with the slant of the first mentioned flanges so that said pair of plates may be tensioned by relatively sliding the pair of plates and the tensioning plate, and a means to adjustably hold the pair of plates and the tensioning plate against relative endwise shifting.

6. An airship provided with a covering of metal plates, alternate plates being spaced and their adjacent edges provided with inturned flanges extending relatively aslant, the plates intermediate of said alternate plates being provided with inturned flanges slidably engaged with the first mentioned flanges, the flanges of the intermediate plates extending relatively aslant to correspond with the slant of the first mentioned flanges, and means to hold said alternate plates and intermediate plates against relative shifting.

Signed at Los Angeles, California, this 28th day of February, 1929.

ANTHONY W. AGLER.